No. 739,531. Patented September 22, 1903.

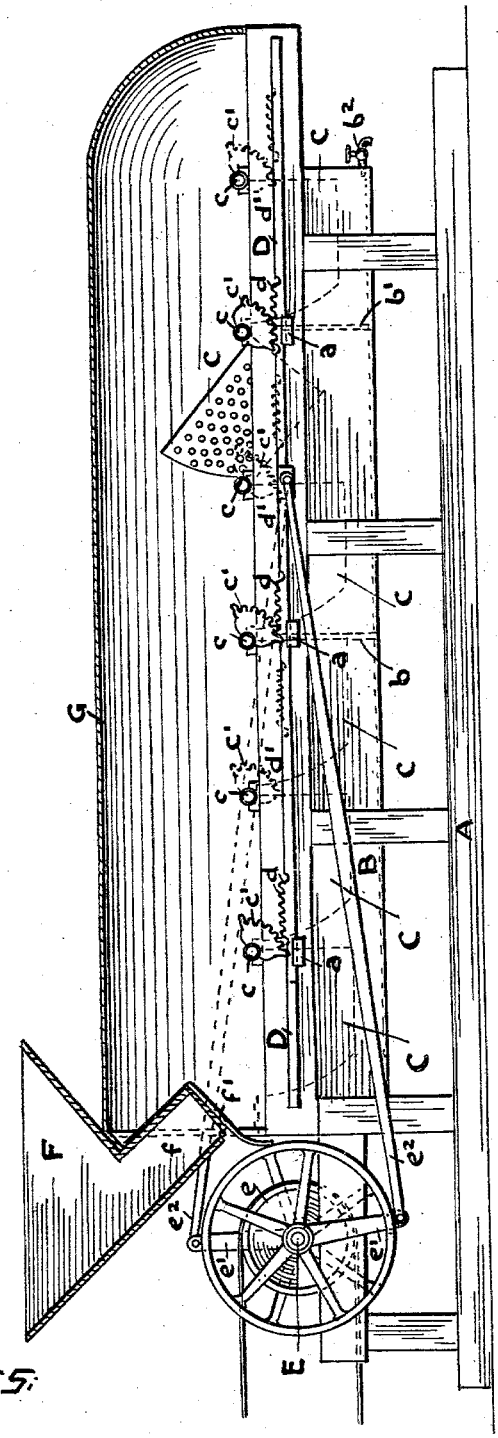

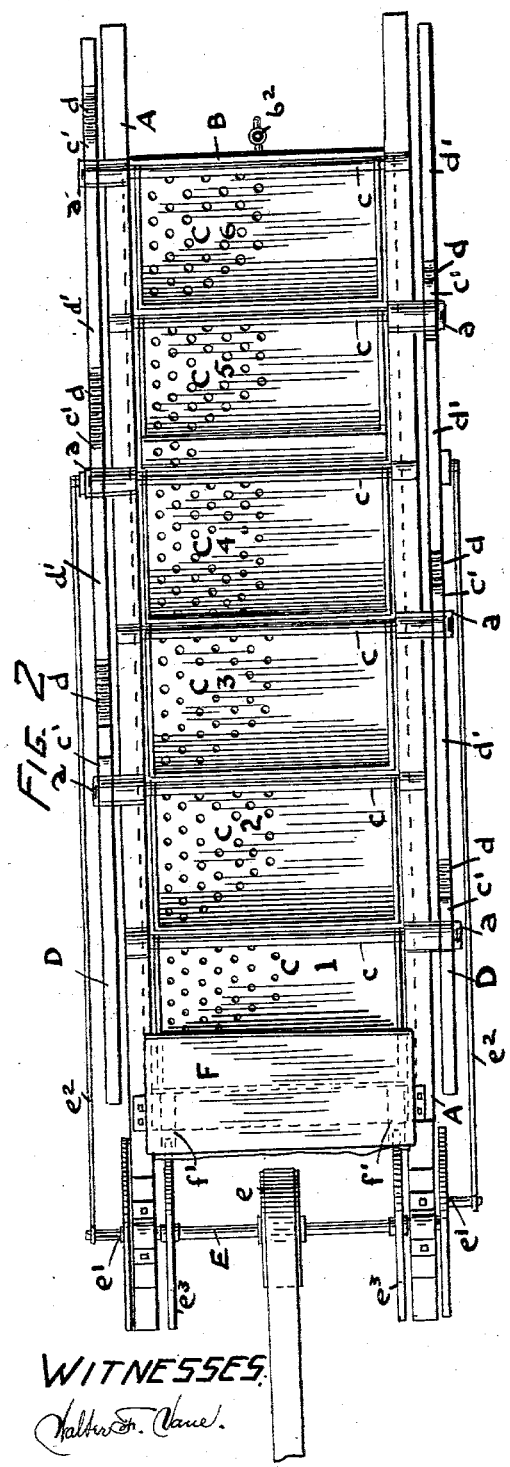
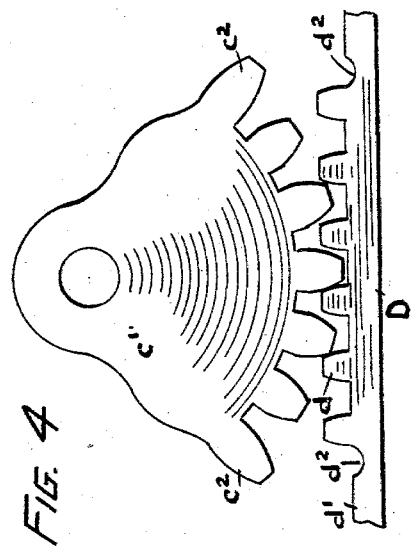
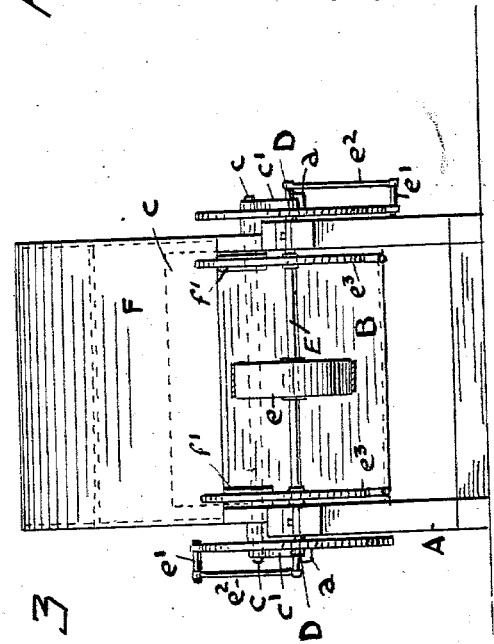

UNITED STATES PATENT OFFICE.

HARVEY M. BARNGROVER, OF SAN JOSE, CALIFORNIA.

FRUIT-DIPPER.

SPECIFICATION forming part of Letters Patent No. 739,531, dated September 22, 1903.

Application filed March 18, 1903. Serial No. 148,299. (No model.)

*To all whom it may concern:*

Be it known that I, HARVEY M. BARNGROVER, a citizen of the United States, residing at San Jose, Santa Clara county, State of California, have invented certain new and useful Improvements in Fruit-Dippers; and I do hereby declare the following to be a full, clear, and exact description of the same.

The invention relates to the general class of fruit-processing machines and apparatus, and particularly to machines for immersing the fruit in a liquid, which machines, by the peculiar action of their fruit-containing vessels or baskets, are commonly known as "dippers."

My invention is adapted for the dipping—that is, the immersion in and removal from the liquid—of fruit at any stage of its manipulation to prepare it for the market; but its particular use and the one in connection with which for the sake of illustration I shall describe it is what is known in the art as the "processing" of prunes.

As is well known, the first manipulation of green prunes is an operation for breaking their tough skins in order that in drying the evaporation of their moisture may freely take place. This operation is effected by one of two methods—to wit, either a mechanical pricking or a dipping in a caustic alkali, to which latter, though not termed "processing," my invention is applicable, but not primarily intended for. The prunes after being thus treated are dried and then put aside in heaps until the time comes to process them for the market. This processing consists in immersing them in various liquids, according to the objects sought. For example, they are immersed in hot water to soften, swell, and clean them. Then they are immersed in one or more of several liquids—such as glycerin, glucose, fruit-syrup, borax, soda bicarbonate, common salt, or combinations of these—which liquids are known as the "dip," to give them gloss, to make them black or shiny, to remove foreign matter, or to do anything else deemed necessary to put them in marketable shape. It is this part of the processing to which my dipper is especially adapted, for in addition to the thoroughness and general efficacy of my device there is secured the main object of my invention—to wit, the convenient and continuous processing of large quantities of fruit with economical expenditure of power and labor.

My invention consists generally in a fruit-dipper comprising a tank or liquid-containing vessel, a series of several successive baskets so mounted that each is adapted to descend into the liquid, then to rise therefrom and to tilt forwardly to discharge its contents into the succeeding basket, and means for swinging said baskets in peculiar succession.

It also consists in the novel construction, arrangement, and combinations of parts, which I shall now describe by reference to the accompanying drawings, in which—

Figure 1 is a side elevation of my dipper. Fig. 2 is a plan of same, the cover G being removed. Fig. 3 is a head end elevation of same. Fig. 4 is an enlarged detail of the basket-swinging sector-pinion and the engaging slide-rack.

A represents a suitable framework carrying a tank B, which contains the liquid or dip.

C represents the dipping vessels or baskets, constructed of suitable perforated or foraminous material. These baskets are arranged in a successive series, and there may be as many of them as desired. Concerning their number I shall use the word "several" in its proper sense of signifying more than two, because in order to obtain the advantages of a continuous process handling large quantities of material and causing the baskets to act alternately to receive from one and to deliver to another it is required to employ more than two. For the sake of illustration I show six in the series. Each basket is connected at its forward top edge with a pivotal shaft $c$, journaled transversely upon frame A, and each basket is so arranged that in its lowermost position it hangs immersed in the liquid of tank B and is adapted to swing with its shaft $c$ as a center in order to rise from the liquid and to tilt forwardly far enough to discharge its contents into the succeeding basket. This movement is given to the baskets by mechanism as follows: Upon one end of each pivotal shaft $c$ is a sector-pinion $c'$. The sector-pinions of the odd-numbered baskets are on the same end of the shafts, while those of the even-numbered baskets are on the other end of the shafts. Thus the sector-pinions of the first, third, and fifth baskets, numbered from the left, are on one end of their respective shafts and those on the second, fourth, and sixth are on the other end. Mounted and adapted to slide in suitable guides $a$ of the frame A are the racks D, one on each side of the frame. The teeth $d$ of these racks are arranged, as shown, at intervals, the intervening portions presenting, as shown at $d'$, straight edges. The teeth $d$ are adapted to engage with the sector-pinions $c'$ and by the movement of the slide-racks swing the baskets, as is obvious. The two racks slide or reciprocate in relatively opposite directions in order to impart relatively opposite movements to the sets of baskets which each actuates, for it will be readily seen that alternate baskets must be in position to receive the contents of the tilted baskets immediately preceding. Any suitable power mechanism and connections may be employed to thus move the racks in relatively opposite directions. For convenience and for illustration I have here shown a power-shaft E, with a drive-pulley $e$. On this shaft are opposing cranks $e'$, each of which is connected, by a pitman $e^2$, with one of the racks D.

F is a feed-hopper having a spout $f$, adapted to deliver the fruit to the first basket. Any suitable charge-regulator may be employed to control this spout. I have here shown a hinged gate $f'$, which has extensions projecting below its hinge, as seen in Fig. 1, said extensions resting on the peripheries of cams $e^3$, (seen in Figs. 2 and 3,) mounted on shaft E, near each end, and controlled thereby to hold the gate closed and to allow it to swing open at suitable intervals.

G is a cover over the machine to retain the heat.

Before proceeding to note some essential details of construction and arrangement it will be well to describe the general operation. Suppose the tank B to contain the liquid or dip of any character and the baskets to be at their lower limit. A charge of prunes is now delivered to the first basket, which basket in due time—that is, after the fruit has been immersed the required length of time—will rise and tilt its contents into basket No. 2, which is still at its lower position. Then basket No. 1 will return and basket No. 2 will tilt its contents into No. 3, which is then in its lower position, and thereupon basket No. 2 will return. A second charge being delivered to basket No. 1, said basket will tilt and deliver its contents to No. 2, and also basket No. 3 will tilt and deliver to No. 4. Baskets 1 and 3 now return and baskets 2 and 4 deliver to 3 and 5, respectively. A third charge delivered to No. 1 will then be tilted into No. 2, while the charges in 3 and 5 will be delivered to 4 and 6. Then when 1, 3, and 5 are returned 2, 4, and 6 deliver to 3 5 and the shaking-table (not shown) at the end of the machine, and so on continuously. In such an operation as this it is obvious that the times of movement of the baskets must be properly proportioned. For example, the empty baskets must be fully returned in time to receive the charge from the hopper or the contents of the preceding baskets, which latter must be timed to deliver only when the succeeding baskets are returned. Moreover, in order to avoid the dead-lift of the swinging baskets, which would occur if all started at the same time, their times of starting, finishing, and returning must be proportionately successive—that is, one must start to rise and must have partially risen before the next starts, and so on; but these times must be confined within the limits of one stroke on each side in order to permit the completion of the return stroke on the other side, which is likewise successive. These results are obtained by the different positions of the teeth $d$ on the racks D relatively to the sector-pinions they engage. For example, in Fig. 1 the teeth $d$ near the right-hand end of the rack D on the remote side have as said rack is moved forward just completed the return of No. 6, basket No. 4, as shown by the position of its operating-teeth, having been returned previously and basket No. 2 having been returned previous to No. 4. Consequently when the remote side rack is drawn back again the basket No. 6 will be started up first, then No. 4 and No. 2 successively. Likewise, as seen in Fig. 1, basket No. 5 is just starting to rise, while baskets 3 and 1 will rise successively as the rack on the near side is drawn back. Thus the end baskets of each series start first to rise, which arrangement in practice accommodates the filling of the hopper properly. Thus the baskets act in relatively changing pairs to continuously receive and advance the charge through the series, and thus also by the relative disposition of the rack-teeth such times of movement may be given as are found best to secure the necessary time of immersion and transfer of the fruit. In order to temporarily hold the baskets in their positions at the limits of their strokes, it will be seen, Fig. 4, that each sector-pinion $c'$ has a terminal long tooth $c^2$ on each side, and the teeth $d$ of the racks have at each end a deeper notch $d^2$ to provide for these long teeth $c^2$ and to permit the engagement of the parts. When the engagement is past, the end teeth $c^2$ rest and slide on the plain or straight edges $d'$ of the racks, thereby preventing the baskets from moving. The tank B may be one continuous chamber or it may be divided by partitions. I have here shown a partition $b$ and a second partition $b'$. In the first compartment thus formed I would place hot water. In the second compartment I would place the dip, and the third compartment I would use as a receiver for the drip from the last basket, which drip may be drawn off through an outlet $b^2$ and saved and returned to the dip.

Having thus described my invention, what I claim as new, and desire to secure by Letters Patent, is—

1. A fruit-dipper consisting of a tank to contain the liquid, a series of several successively-arranged tilting baskets adapted to be immersed in and removed from the liquid in the tank and relatively disposed to discharge their contents from one to the other successively through the series, a pinion on the pivotal connection of each basket, and a pair of relatively oppositely-reciprocating racks each engaging a pinion of alternate baskets, whereby adjacent ones are swung in relatively opposite directions and each basket serves, alternately, as a receiver and as a deliverer to advance the fruit through the series.

2. A fruit-dipper consisting of a tank to contain the liquid, a series of several successively-arranged tilting baskets adapted to be immersed in the tank and relatively disposed to discharge their contents from one to the other successively through the series, a pinion on the pivotal connection of each basket, and a pair of oppositely-reciprocating racks each engaging a pinion of alternate baskets whereby adjacent baskets are swung in relatively opposite directions and each basket serves alternately as a receiver and a deliverer to advance the fruit through the series, said racks having their engaging teeth disposed at intervals to engage the several pinions in succession whereby the baskets are started successively.

3. A fruit-dipper consisting of a tank to contain the liquid, a series of several successively-arranged tilting baskets adapted to be immersed in and removed from the liquid in the tank and relatively disposed to discharge their contents from one to the other successively through the series, a sector-pinion on the pivotal connection of each basket, said pinion having relatively longer terminal teeth, and a pair of relatively oppositely-reciprocating racks, provided with teeth at intervals and intervening straight edges, the terminals of said teeth being relatively deeper to accommodate the longer terminal teeth of the pinions, said racks operating alternate baskets, whereby adjacent ones are swung in relatively opposite directions and each basket serves alternately as a receiver and a deliverer to advance the fruit through the series.

In witness whereof I have hereunto set my hand.

HARVEY M. BARNGROVER.

Witnesses:
WILL M. BEGGS,
LAURA I. BRITTON.